(12) United States Patent  (10) Patent No.: US 9,294,573 B2
Fletcher et al.  (45) Date of Patent: Mar. 22, 2016

(54) DETERMINING THE STATUS OF A DEVICE THROUGH USE OF A PUBLISHER/SUBSCRIBER INTERFACE

(75) Inventors: Benjamin Joseph Fletcher, Huddersfield (GB); Andrew James Stanford-Clark, Chale (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 2477 days.

(21) Appl. No.: 11/935,465

(22) Filed: Nov. 6, 2007

(65) Prior Publication Data

US 2008/0294732 A1 Nov. 27, 2008

(30) Foreign Application Priority Data

Nov. 11, 2006 (GB) .................................. 0622551.0

(51) Int. Cl.
 *G06F 15/16* (2006.01)
 *H04L 29/08* (2006.01)
 *H04L 12/26* (2006.01)
(52) U.S. Cl.
 CPC ............ *H04L 67/16* (2013.01); *H04L 43/0811* (2013.01); *H04L 43/10* (2013.01); *H04L 67/2819* (2013.01)
(58) Field of Classification Search
 CPC ....... H04L 12/581; H04L 51/04; H04L 67/24; H04L 67/325
 USPC ......................................... 709/245, 204, 206
 See application file for complete search history.

(56) References Cited

U.S. PATENT DOCUMENTS

| 7,502,339 B1* | 3/2009 | Pirkola et al. ................. 370/310 |
| 2002/0087722 A1* | 7/2002 | Datta et al. .................... 709/239 |
| 2005/0021622 A1* | 1/2005 | Cullen ........................... 709/204 |
| 2006/0031394 A1* | 2/2006 | Tazuma ......................... 709/217 |
| 2006/0209868 A1* | 9/2006 | Callaghan ..................... 370/428 |
| 2012/0272252 A1* | 10/2012 | Beardsmore et al. ......... 719/328 |
| 2015/0207857 A1* | 7/2015 | Horton .......................... 709/204 |

* cited by examiner

*Primary Examiner* — Hitesh Patel
(74) *Attorney, Agent, or Firm* — Steven L. Nichols; Fabian Vancott

(57) ABSTRACT

A publish/subscribe interface is used to enable a non-publish/subscribe first system (such as an IP network device) to obtain status information about a publish/subscribe device that cannot be pinged by the first system. The first system sends a status request to a domain name server associated with a system known to include the publish/subscribe device. The status request includes a domain name for the publish/subscribe device. Topic space maintained by a message broker in the publish/subscribe system includes status topics associated with publish/subscribe devices. The status topics contents reflect the current availability of the associated publish/subscribe device. The domain name is mapped to a status topic associated to the publish/subscribe device identified in the status request and the contents of that status topic are retrieved. If the contents have a first value, a "good" IP address is returned to the first system. If the contents have the second value, a "bad" IP address is returned. The return address is used in ping messages. If the ping operation succeeds, it is concluded the publish/subscribe device is online. If the ping operation fails, it is concluded that the publish/subscribe device is off-line.

23 Claims, 3 Drawing Sheets

DETERMINING THE STATUS OF A DEVICE THROUGH USE OF A PUBLISHER/SUBSCRIBER INTERFACE

BACKGROUND OF THE INVENTION

The present invention relates to determining the status of a device through use of a publisher/subscriber (pub/sub) interface.

Publish/subscribe data processing systems have become very popular as a way of distributing data messages. Publishers are not concerned with where their publications are going, and subscribers are not interested in where the messages they receive have come from. Instead, a message broker typically assures the integrity of the message source, and manages the distribution of the message according to the subscriptions registered in the broker.

Publishers and subscribers may interact with a network of brokers, each of which propagates subscriptions and forwards publications to other brokers within the network. When the term "broker" is used, it should be taken as encompassing a single broker or multiple brokers working together in a network.

FIG. 1 illustrates a typical publish/subscribe data processing system according to the prior art. A message broker 15 has an input mechanism 20 which may be, for example, an input queue or a synchronous input node by which messages are input when they are sent by publishers, such as publishers 5,10 to the message broker. A published message is fetched from the input mechanism by a controller 40 and processed to determine, among other things, to which subscribers, for example, subscribers 60, 65, 70, the message should be sent.

The use of topics is a key to the delivery of messages from publishers to subscribers. When a subscriber registers, that subscriber must specify a delivery mechanism by which it wants to receive messages and must define the types of messages it wishes to receive; that is, the topics. A subscriber can, for example, specify that it wishes to receive messages including a topic string such as "employee/salary". The broker uses a matching engine 30 to attempt to match a published message having a particular topic string with subscribers who have indicated they want to receive messages including that topic string. When a match is found, the message is forwarded to the subscriber via an output mechanism 50. While the drawing shows a message broker having only a single input mechanism and a single output mechanism to simplify the description, a message broker will typically support multiple input and output mechanisms.

It is common practice in publish/subscribe messaging environments to make use of a particular kind of topic, a status topic, in the message broker to retain data indicative of the availability of a pub/sub system or device. The term "device" should be construed as encompassing software applications running on hardware systems. The device availability data may be implemented as a "retained" publication, indicating the current status of a client. Client status is updated when a publish/subscribe client comes online and reports its status or when it goes offline.

While broker-maintained device availability data is useful in publisher/subscriber systems, such data has not been available to devices that do not implement a publisher/subscriber interface. A common example of a network device that has not been able to make use of publisher/subscriber device availability data is a network device operating in an IP (Internet Protocol) network.

IP devices typically attempt to discover the availability of other devices through the execution of a PING process. In a PING process, a first system attempts to discover the availability of a second system by sending several PING messages to the second system, that may be identified in the messages either by an alphanumeric domain name or numeric IP address. If the second system is capable of responding, it responds to each PING message. Each response echoes the second system's IP address and contains a response time value. If the second system is off-line or otherwise unreachable, PING process software in the first system will time out, indicating failure to reach the second system.

FIG. 2 is a graphical representation of a conventional PING operation performed in an IP network. An IP device 80 attempts to PING device identified by the alphanumeric domain name "A.mqtt.org". In an IP network, messages are not sent directly to the device when the device has been identified only by its alphanumeric domain name. Device 80's request is sent to a local domain name server (DNS) 90 that attempts to resolve the "A.mqtt.org" domain name to a numeric IP address; e.g., 1.2.3.4. If the local domain name server is unable to resolve the domain name to an IP address, it directs device 80 to a remote domain name server 95 having assigned responsibility for the specified domain (e.g. mqtt.org). DNS 95 may resolve "A.mqtt.org" to a numeric IP address (e.g., 1.2.3.4) using an IP address mapping table and then inform device 80 of the numeric IP address to which the PING messages should be routed. When the PING messages reach device "A.mqtt.org", that device will respond if it is online. Otherwise, the PING process at device 80 will time out, indicating A.mqtt.org is not reachable.

Publish/subscribe devices may be behind a company firewall and cannot be PINGed directly to determine their status. Further, some publish/subscribe devices can only be reached via a publish/subscribe mechanism on a network which does not include the ability to respond to PING requests (for example, a non-IP network).

BRIEF SUMMARY OF THE INVENTION

The invention may be implemented as a method for enabling a first network device to use a PING process to determine whether a second network device is online or off-line where the first device cannot directly contact the second device. A status request is received from the first device at a domain name server. A determination is made at the domain name server whether the second device is online or off-line. If the second device is online, a first network address is returned to the first network device. If the second device is off-line, a second network address is returned to the first network device. When the first network address is later used in a PING process, the responses to the PING will indicate the second device. When the second network address is used, the PING process will timeout, indicating the second device is unavailable.

The invention may also be implemented as a computer program product for enabling a first network device to determine whether a second network device is online or off-line. The computer program product includes a computer usable medium embodying program code that receives a request from the first device for the status of the second device and that determines whether the second device is online or off-line. A computer program product further includes program code that causes a first network address to be returned to the first device if it is determined that the second device is online and a second network address to be returned to the first device if it is determined that the second device is off-line.

Finally, the invention may be implemented as an apparatus for enabling the first network device to determine whether a second network device is online or off-line where the first device cannot directly contact the second device with a status query. The apparatus includes a receiver component that receives the status request from the first device. The status request includes a second device identifier. The apparatus also includes a data storage component for storing status data and the mapping component for mapping the second device identifier to a data storage component location associated with the second device. A status query component obtains data stored in the data storage location. An address returning component returns the first network address if the obtained data has a first value or second address to the obtained data and the second value.

DETAILED DESCRIPTION OF THE INVENTION

Figure 1:
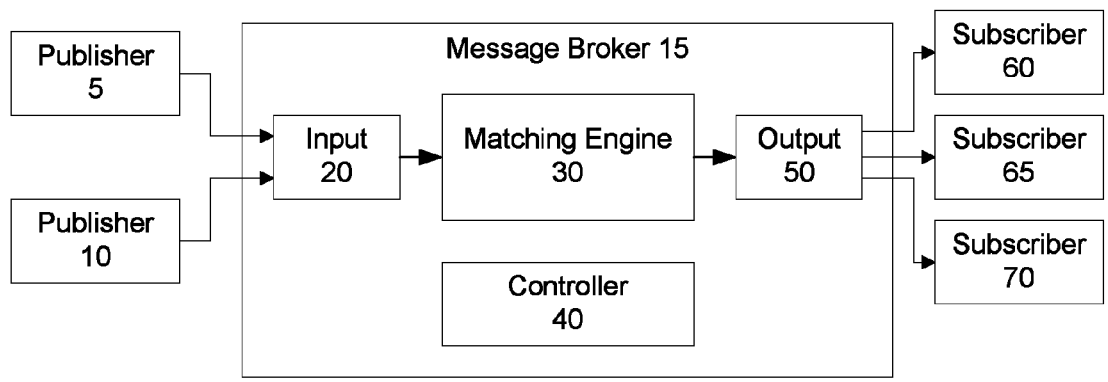
FIG. 1 illustrates a prior art publish/subscribe messaging environment.
Figure 2:
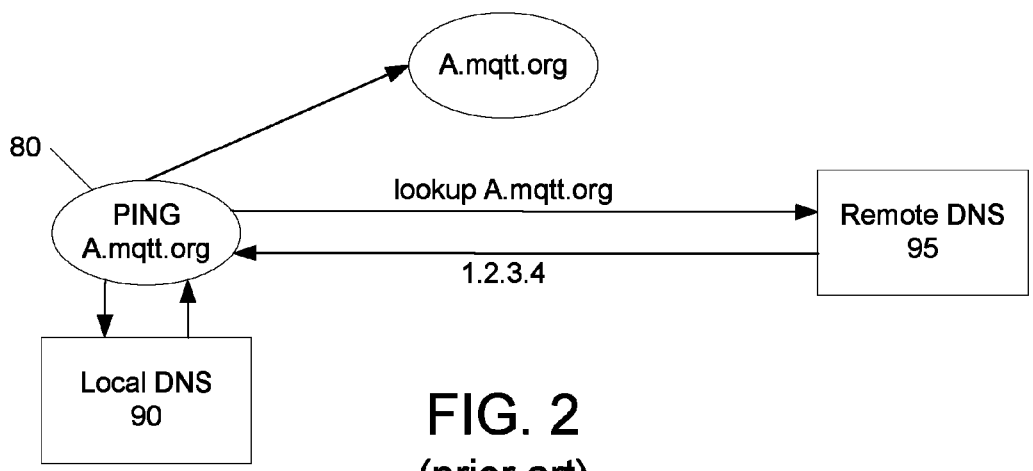
FIG. 2 is a graphical overview of a process for determining the availability of the remote system using domain name servers and a conventional PING operation.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, commu-nicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Figure 3:
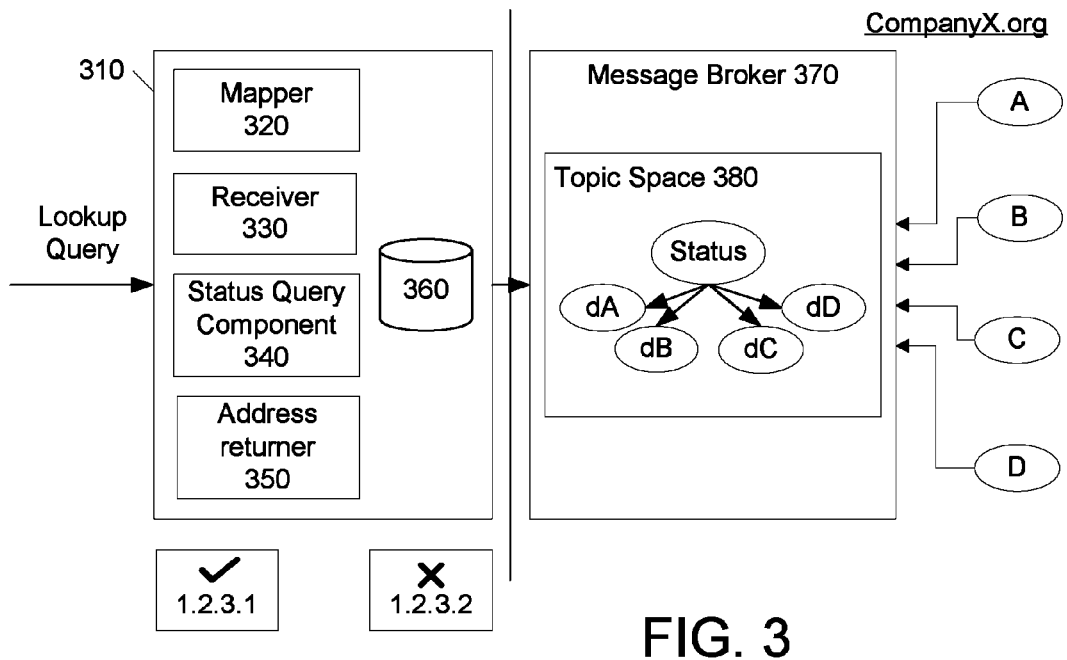
FIG. 3 is a functional block diagram of a system for implementing the present invention using a publisher/subscriber system interface.

As noted earlier, publisher/subscriber systems, and particularly message brokers in such systems, maintain device availability information that is currently available only to devices that implement a publish/subscribe interface The present invention is a solution that enables an IP network device to determine the status of a publish/subscribe device that is not directly visible to the IP network device through a lookup operation performed using a publish/subscribe interface. The lookup operation supports a PING operation initiated by a requesting device, as will be described in more detail below The invoked lookup operation is described below with reference to FIG. 3. It is assumed that an IP network device (not shown) wants to determine the status of a publish/subscribe device "A" owned by CompanyX.org but cannot obtain the desired information directly. The network device sends a request for the device A.CompanyX.org to a domain name server 310 associated with CompanyX.org where it is received by receiver component 330. Device A may be one of several devices A, B, C and D that are owned by CompanyX.org and that periodically publish their status to a status topic stored in a topic space 380 maintained at message broker 370.

The topic space 380 contains a tree structure that represents device status information. In an exemplary embodiment, the tree comprises a "status" root node and a plurality of child nodes. Each child node represents a publish/subscribe device (device A=dA; device B=dB; device C=dC; and device D=dD). Each device publishes a "1" to the appropriate child node when it comes "online" and publishes a "0" when it goes "offline". Therefore, when device A comes online, it publishes a "1" to topic status dA. Message broker 370 retains the last publication received on each status topic and thereby knows whether a device is classified as "online" or "offline". Of course, a device may fail rather than intentionally go "offline". When this happens, the message broker 370 can detect that the connection to the device is broken and therefore that the device is "offline". In this instance, message broker 370 itself publishes a "0" to the appropriate status topic.

When a request is received for the status of A.CompanyX.org, one of the devices owned by CompanyX.org, a mapper component 320 maps the request to a status topic within topic space 380. Mapper component 320 uses data in a database 360 to resolve the provided address for A.CompanyX.org to topic status dA maintained in the topic space 380 of message broker 370. A status query component 340 then queries the status of the publish/subscribe device via the publish/subscribe interface of message broker 370 by setting up a subscription to the appropriate topic (e.g. status dA). Such a subscription causes message broker 370 to send the last publication (retained publication) received on that topic to the domain name server 310. The domain name server 210 can then either remain subscribed to the topic in order to be able to more quickly fill future requests (e.g. from a local cache) or can immediately unsubscribe from the status topic.

In another embodiment, the domain name server 310 may subscribe in advance to topics maintained in topic space 380 for all publish/subscribe devices that it intends to monitor and maintain a table of status information gleaned from the last received publication for each device. Such a table would, of course, be periodically updated to reflect changes in the current status of the monitored publish/subscribe devices.

Status query component 340 uses the retrieved retained publication information to determine whether the queried device (i.e., A.CompanyX.org) is "online" or "offline". If the retained publication contains a "1", then the queried device is considered to be "online". If the retained publication contains a "0", then the queried device is considered to be "offline".

For an "online" device, status query component 340 instructs the address returner component 350 to return an IP address of a device which the requesting device can contact for an online status indication. In the illustrated embodiment, the IP address of the good machine is shown as 1.2.3.1. This may be the address of the domain name server 310 itself (since server 310 is known to be online and contactable by the requester) or an entirely separate machine. The fact that an IP address is returned at all is an indication the publish/subscribe device is online.

If the publish/subscribe query of the status topic dA indicates A.CompanyX.org is "offline" or unreachable, status query component 340 instructs address returner component 350 to return a known "bad" address. In the illustrated embodiment, the known "bad" IP address of the uncontactable machine is shown as 1.2.3.2. When a PING is sent to the known "bad" IP address, the requesting machine will time out indicating the sought publish/subscribe device is unreachable.

Both the good and the bad returned addresses are preferably associated with the domain over which the owner of domain name server has jurisdiction in order to assure that the good and the bad returned addresses will remain good and bad, respectively. A returned bad machine address could be an unallocated address in the same IP subnet of the domain name server 310, which is under administrative control of the domain name server owner, which can ensure the address will remain unallocated.

Figure 4:
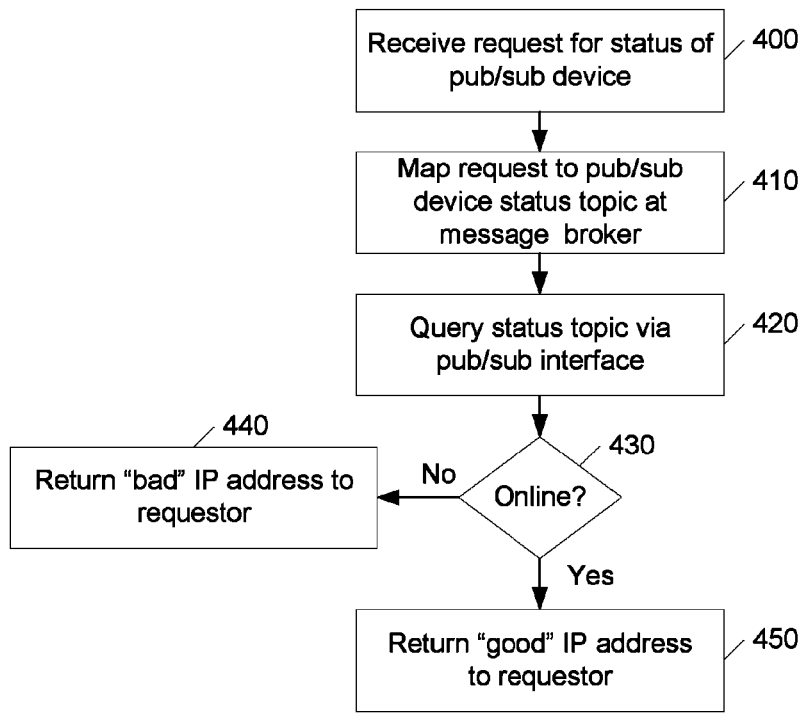
FIG. 4 is a flowchart of basic operations performed in the system illustrated in FIG. 3.
Figure 5:
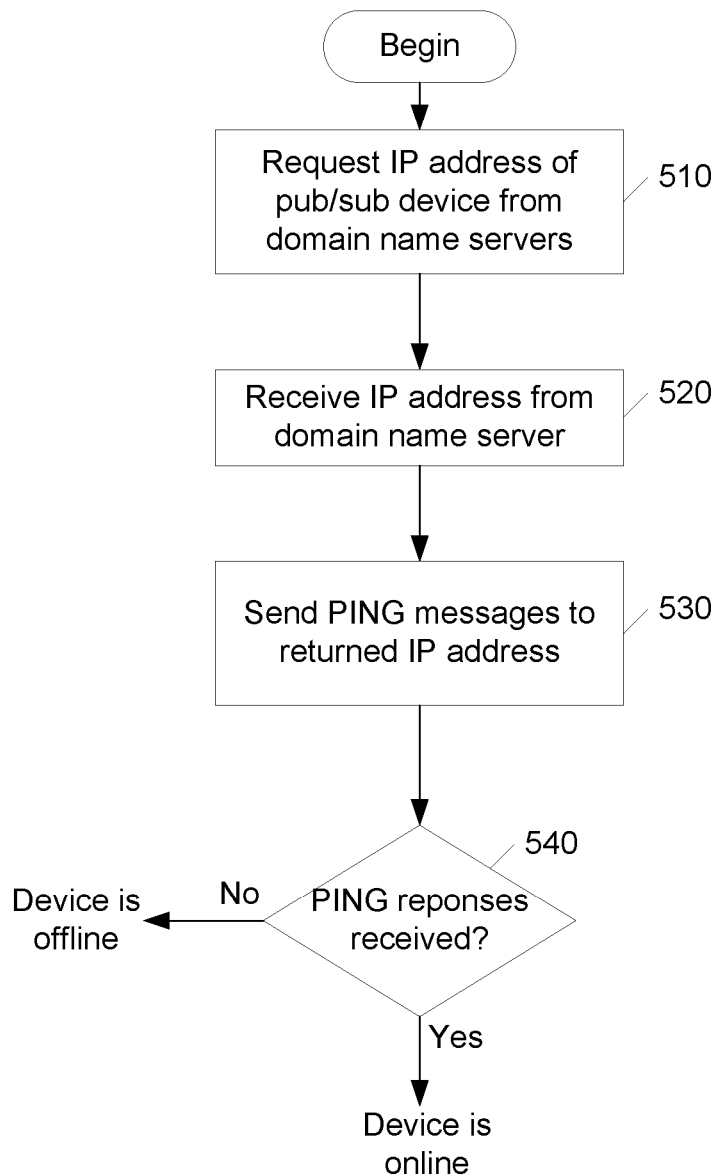
FIG. 5 is a flow chart of steps that are performed at a requesting system to complete a status query through use of a publish/subscribe interface.

FIG. 4 is a representation of the process discussed above in flowchart form. In initial operation 400, a request is received for information about a specific publish/subscribe device; i.e., A.CompanyX.org, that cannot be contacted directly by the requesting device. The received request is mapped in operation 410 to an A.CompanyX.org status topic dA maintained by the message broker and a query 420 is generated to retrieve availability information stored in that status topic. If an operation 430 shows that A.CompanyX.org is currently offline or otherwise unreachable, a "bad" IP address is returned to the requester in an operation 440. If the operation 430 shows that A.CompanyX.org is currently online, a "good" IP address is returned to the requester in operation 450. The use of the publish/subscribe interface ends at this point The requester will not know whether the IP address returned through the use of the publish/subscribe interface is "good" (representing an online publish/subscribe device) or "bad" (representing an offline publish/subscribe device). The requesting device must employ a PING process in order to complete the device status query. FIG. 5 is a flow chart of operations that are performed at a requesting device, including the necessary PING process.

Initial operation 510 is the request made by the requesting device to the publish/subscribe interface and described previously with reference to FIGS. 3 and 4. Operation 520 is the receipt of an IP address from the publish/subscribe domain name server. At this point, the requesting device will not yet know whether the received IP address is "good" or "bad". The requesting device employs a conventional PING operation 530 of the type described above by sending a series of PING messages to the IP address returned from the publish/subscribe domain name server. If operation 540 indicates that appropriate responses (IP address plus response time) are returned, the conclusion is that the device associated with the query is online. If operation 540 indicates that no responses or inappropriate responses are returned, the conclusion is that the device associated with query is offline.

The present invention is not necessarily limited to environments including the use of PING processes, IP requesting devices and publish/subscribe interfaces. Other uses include representing a person's online status with respect to, for example, an instant messaging system or connected using a mobile application. The querying device may not have the appropriate software to directly contact the device but may be able to use basic, ubiquitous software such as PING to discover a device's status indirectly. In such a solution an intermediary DNS is able to query the device and to return one of a good and bad address to the requester.

Further, it is envisaged the invention may be used to enable a regular IP network management tool to monitor remote devices which are not directly accessible to the network management tool, including remote devices on a non-IP network. The network management tool would use standard alerting and notification systems to inform a requester that a device (rather than a network host) had gone offline.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to preferred embodiments thereof, it will be apparent that modifications and variations are possible without departing from the scope of the invention defined in the appended claims.

What is claimed is:

1. A method for enabling a first computer network device to determine whether a second computer network device has an online status or an offline status where the first computer network device cannot directly contact the second computer network device, the method comprising:
   receiving a request from the first computer network device for the status of the second computer network device;
   determining whether the second computer network device is online or offline;
   in response to a determination that the second computer network device is online, returning a first network address to the first computer network device; and
   in response to a determination that the second computer network device is offline, returning a second network address to the first computer network device, wherein the second network address is a known bad address that will not provide a response to the first computer network device.

2. The method of claim 1, wherein the second computer network device is a publish/subscribe device and wherein determining whether the second computer network device is online or offline further comprises mapping the received request to a status topic associated with the second device.

3. The method of claim 2, wherein determining whether the second computer network device is online or offline further comprises:
   subscribing to the status topic associated with the second computer network device; and
   receiving status information from the subscribed status topic.

4. The method of claim 3 wherein determining whether the second computer network device is online or offline further comprises:
   associating status information having a first value to an online status; and
   associating status information having a second value to an offline status.

5. The method of claim 4 further comprising storing received status information for the second device locally.

6. A computer program product for enabling a first computer network device to determine whether a second computer network device has an online status or an offline status where the first computer network device cannot directly contact the second computer network device, the computer program product comprising a non-transitory computer usable storage medium having computer usable program code embodied therewith, the computer usable program code comprising:
   computer usable program code configured to receive a request from the first computer network device for the status of the second computer network device;
   computer usable program code configured to determine whether the second computer network device is online or offline;
   computer usable program code configured to, in response to a determination that the second computer network device is online, return a first network address to the first computer network device; and
   computer usable program code configured, to in response to a determination that the second computer network device is offline, return a second network address to the first computer network device, wherein the second network address is a known bad address that will not provide a response to the first computer network device.

7. The computer program product of claim 6, wherein the second computer network device is a publish/subscribe device and wherein the computer usable program code configured to determine whether the second computer network device is online or offline further comprises computer usable program code configured to map the received request to a status topic associated with the second device.

8. The computer program product of claim 7, wherein the computer usable program code configured to determine whether the second computer network device is online or offline further comprises:
- computer usable program code configured to subscribe to the status topic associated with the second computer network device; and
- computer usable program code configured to receive status information from the subscribed status topic.

9. The computer program product of claim 8 wherein the computer usable program code configured to determine whether the second computer network device is online or offline further comprises:
- computer usable program code configured to associate status information having a first value to an online status; and
- computer usable program code configured to associate status information having a second value to an offline status.

10. The computer program product of claim 9 further comprising computer usable program code configured to store received status information for the second computer network device locally.

11. An apparatus for enabling a first computer network device to determine whether a second computer network device has an online status or an offline status where the first computer network device cannot directly contact the second computer network device to determine the status of the second computer network device, the apparatus comprising a server comprising:
- a processor;
- a memory device for use by the processor;
- a receiver component for receiving a request from the first computer network device for the status of the second computer network device, said request including a second computer network device identifier;
- a data storage component for storing status data;
- a mapping component for mapping the second computer network device identifier to an associated status data storage location in the data storage component;
- a status query component for obtaining data stored in the associated status data storage location;
- an address returning component for returning a first network address if the obtained data has a first value and a second network address if the obtained data as a second value, wherein the second network address is a known bad address that will not provide a response to the first computer network device.

12. The apparatus of claim 11 wherein said first network address is associated to a reachable computer network device and said second network address is associated to an unreachable computer network device.

13. The apparatus of claim 12 wherein said data storage component comprises topic space maintained by a message broker and a publish/subscribe system and said associated status data storage location comprises a status topic associated to said second computer network device.

14. The apparatus of claim 11 wherein said data storage component comprises topic space maintained by a message broker and a publish/subscribe system and said associated status data storage location comprises a status topic associated to said second computer network device.

15. The apparatus of claim 14 wherein said the status query component further comprises:
- a subscription component for establishing a subscription to said associated status topic associated to said second computer network device; and
- a message receiving component for receiving information currently stored in said associated status topic.

16. The apparatus of claim 15 further comprising logic for determining whether the information received by the message receiving component has said first value indicative of an online device status or said second value indicative of an off-line device status.

17. The apparatus of claim 16 further comprising a local memory component for retaining the information received by said message receiving component.

18. The apparatus of claim 11, wherein said server comprises a domain name server for resolving network addresses.

19. The apparatus of claim 11, wherein said server comprises an interface for communicating with a message broker of a publish/subscribe system which publish/subscribe system includes said second computer network.

20. The apparatus of claim 11, wherein said status query component is programmed for obtaining data from said message broker via said interface, said data indicating the online or offline status of said second computer network device.

21. An apparatus for enabling a first computer network device to determine whether a second computer network device has an online status or an offline status, the apparatus comprising:
- a domain name server for resolving network addresses, said domain name server comprising:
  - a processor;
  - a memory device for use by the processor;
  - a receiver component for receiving a request from the first computer network device for the status of the second computer network device, said request including a second computer network device identifier;
  - an interface for communicating with a message broker of a publish/subscribe system which publish/subscribe system includes said second computer network;
  - a status query component for obtaining data from said message broker via said interface, said data indicating the online or offline status of said second computer network device; and
  - an address returning component for returning a first network address if the data from the message broker indicates the second computer network device is online and a second network address if the data from the message broker indicates the second computer network device is offline.

22. The apparatus of claim 21, wherein the second network address is a known bad address that will not provide a response to the first computer network device.

23. The apparatus of claim 21, wherein said status query component obtains said data from said message broker by subscribing to a topic handled by said message broker that corresponds to the online/offline status of said second computer network device.

* * * * *